United States Patent
Jai et al.

(10) Patent No.: US 7,734,761 B2
(45) Date of Patent: Jun. 8, 2010

(54) SYSTEM AND METHOD FOR RETRIEVING NETWORK MANAGEMENT DATA FROM MULTIPLE NETWORK ELEMENTS

(75) Inventors: Ben Jai, Scotch Plains, NJ (US); Clifford E. Martin, Martinsville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1329 days.

(21) Appl. No.: 10/370,805

(22) Filed: Feb. 20, 2003

(65) Prior Publication Data

US 2004/0199619 A1 Oct. 7, 2004

(51) Int. Cl.
*G06F 15/173* (2006.01)
(52) U.S. Cl. .................................. 709/224; 709/238
(58) Field of Classification Search .............. 709/238, 709/224; 370/245
See application file for complete search history.

(56) References Cited

U.S. PATENT DOCUMENTS

| 5,931,911 | A  | * | 8/1999 | Remy et al. | 709/223 |
| 6,757,280 | B1 | * | 6/2004 | Wilson, Jr. | 370/389 |
| 2002/0075809 | A1 | * | 6/2002 | Phaal | 370/245 |
| 2004/0088405 | A1 | * | 5/2004 | Aggarwal | 709/224 |

* cited by examiner

*Primary Examiner*—Nathan Flynn
*Assistant Examiner*—Chirag R Patel
(74) *Attorney, Agent, or Firm*—Hitt Gaines, PC

(57) ABSTRACT

A system for, and method of, retrieving network management data in a network and a network management station incorporating the system or the method. In one embodiment, the system includes: (1) an information querier, associated with a network management station, that develops a query for at least some network management data from a target agent in the network and assigns a path for a response from the target agent that is unique to the target agent and (2) a response receiver, associated with the information querier, that receives, via the path, the response from the target agent containing the at least some the network management data.

17 Claims, 2 Drawing Sheets

SYSTEM AND METHOD FOR RETRIEVING NETWORK MANAGEMENT DATA FROM MULTIPLE NETWORK ELEMENTS

TECHNICAL FIELD OF THE INVENTION

The present invention is directed, in general, to network management and, more specifically, to a system and method for retrieving network management data from multiple network elements.

BACKGROUND OF THE INVENTION

Networks have become critical to today's society. Their importance is reflected not only in the number of elements (such as servers, clients, hubs, routers and gateways) that are networked together, but also in the varied and complex ways those elements are interconnected. Undisputably the most widely recognized example of a network is the Internet, which is responsible for interconnecting countless subnets and individual servers and clients.

As networks have become more complex, network management has likewise become more automated and standardized. One widely employed architecture for automatically managing networks adopts a manager/agent topology. Network management stations (NMSs) are employed to supervise agents associated with each element in the network that is to be managed. Each agent has access to a management information base (MIB) that contains data regarding its associated element. The data include, for example, a unique identity for the element, its operating characteristics and the identities of other elements to which it is connected. The NMSs query the various agents for the data from their respective MIBs. These queries, transported to the agents in packets, conform to a standard protocol called the Simple Network Management Protocol, or SNMP.

The data gathered by the NMSs by means of these messages are used to model the network in various known ways. Once a model or models are developed, the operation of the network may be optimized and problems that may occur in the network from time to time can be diagnosed, localized or resolved.

For example, in a network having a server, a router, a gateway and a hub, it is desired to allow an NMS to manage the network. First, the NMS sends a packet containing an SNMP query to, for example, the server. The server's agent responds with one or more packets containing its MIB response. Then, the NMS sends a packet containing another SNMP query to, for example, the router. The router' agent responds with one or more packets containing its MIB response. Then, the NMS sends a packet containing an SNMP query to, for example, the gateway. The gateway's agent responds with one or more packets containing its MIB response. Finally, the NMS sends a packet containing an SNMP query to the hub. The hub's agent responds with one or more packets containing its MIB response.

At the risk of being repetitious, the point is made that gathering MIB information is a serial process. The underlying reason for this is that requests must be fulfilled one at a time. Otherwise, the MIB information from one element can become confused with the MIB information from another element, corrupting the data-gathering process.

Unfortunately, an individual query/response can take a counterintuitively long time. It has been determined that, on average, query/responses in modern Internet Protocol (IP) networks take about a minute to complete. For the exemplary network above, the query/response time is about four minutes.

One minute per element may not at first glance seem to be an inordinate delay, but modern networks may contain many thousands of elements. In such networks, delays of many thousands of minutes before meaningful network management can be put in place is unacceptable. Accordingly, what is needed in the art is a faster way to retrieve the MIB information necessary for modeling a network so networks can come under effective management faster.

SUMMARY OF THE INVENTION

To address the above-discussed deficiencies of the prior art, the present invention provides a system for, and method of, retrieving network management data in a network and a network management station incorporating the system or the method. In one embodiment, the system includes: (1) an information querier, associated with a network management station, that develops a query for at least some network management data from a target agent in the network and assigns a path for a response from the target agent that is unique to the target agent and (2) a response receiver, associated with the information querier, that receives, via the path, the response from the target agent containing the at least some the network management data.

The present invention therefore introduces the broad concept of providing separate paths for responses to network management data queries such that the responses do not become commingled and corrupt.

The conventional MIB information retrieval process described in the Background of the Invention section above is serial because the paths used by the NMSs and the agents are standard. More specifically, the IP address of the NMS is the same for all responses. Further, conventional NMSs use port 1961, and conventional agents use port 161.

The present invention is based on the realization that, while the number and commercial source of agents in a network are great (effectively precluding changing port 161), the number of NMSs is small. Thus, the NMSs can be modified to accommodate multiple paths for responses from agents. This allows multiple paths to be used for parallel retrieval of network management data.

In one embodiment of the present invention, the information querier identifies the path in a source address of a packet bearing the query. In an alternative embodiment, the information querier identifies the path in a port assignment of a packet bearing the query. In an embodiment to be illustrated and described, the path is identified in a port assignment of an IP packet bearing the query. When the target agent responds, the response is automatically routed according to the source address and port assignment. An alternative embodiment will also be disclosed a unique source address is employed to define each path.

In one embodiment of the present invention, the response receiver comprises a buffer that receives and contains the response. The response receiver reads the response from the buffer following a predetermined period of time. Alternatively, the response receiver can count responses and read the responses from the buffer based on the count. Alternatively, the response receiver can handle responses one at a time.

In one embodiment of the present invention, the response is a first response and the information querier develops a second query for at least some network management data from a second target agent in the network and assigns a second path for a second response from the second target agent that is unique to the second target agent before the response receiver receives the first response. The present invention can offer a substantial advantage in allowing network management data queries and responses to be performed in parallel, allowing the process of gathering network management data to be performed substantially faster.

In one embodiment of the present invention, the query and the response conform to SNMP, and the network is an IP network.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
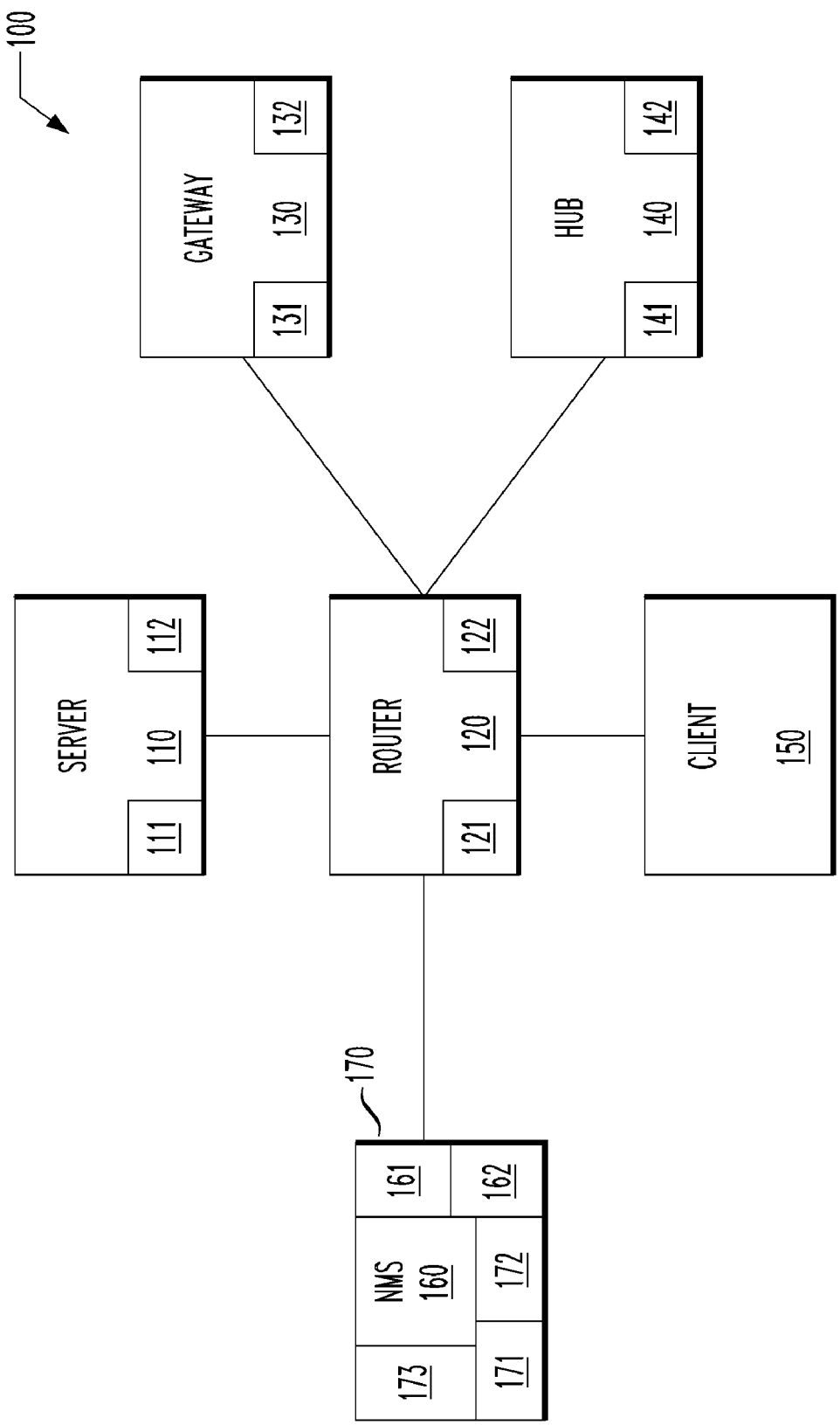
FIG. 1 illustrates an NMS incorporating a system for retrieving network management data constructed according to the principles of the present invention and a network having elements from which network management data are to be retrieved.

Referring initially to FIG. 1, illustrated is an NMS incorporating a system for retrieving network management data constructed according to the principles of the present invention. FIG. 1 also illustrates a network coupled to the having elements from which network management data are to be retrieved. The network, generally designated 100, is illustrated as including a server 110, a router 120, a gateway 130, a hub 140 and a client 150. Those skilled in the art understand, however, that a real-world network would commonly have many of each of these representative network elements.

Each of the server 110, the router 120, the gateway 130 and the hub 140 has an associated SNMP agent (agents 111, 121, 131, 141, respectively) that allows its respective element to be managed by an NMS.

The agents 111, 121, 131, 141 are conventional. That is, the agents 111, 121, 131, 141 monitor port number 161 for packets containing SNMP messages (including "get" messages that function as queries). The agents 111, 121, 131, 141 conventionally react to the SNMP messages by reading from or writing to associated MIB memory (MIB memory 112, 122, 132, 142) that contains network management data regarding the associated element. Standards with which those skilled in the pertinent art are familiar govern the content, structure and retrieval of the network management data.

In the case of SNMP "get" messages, the agents 111, 121, 131, 141 generate responses containing at least some of the network management data and cause those responses to be encapsulated into a packet and returned to the same network address from which the original packet bearing the SNMP "get" message was sent. Thus, the agents 111, 121, 131, 141 copy a source address field in the packet containing the SNMP "get" message to a destination address field in the packet containing the response.

As has been described above, conventional NMSs have only used port number 1961 as the source address in packets they originate. Thus, the destination address field generated by the agents 111, 121, 131, 141 has heretofore referred only to port number 1961. The embodiment of FIG. 1 is not limited to port number 1961.

The illustrated system, constructed according to the principles of the present invention, is generally referenced 170 and allows this artificial constraint to be lifted to significant advantage. The system 170 is illustrated as being incorporated into an NMS 160. In addition to the system 170, the NMS 160 includes a network interface 161 for linking the NMS 160 to the network 100. The NMS 160 also includes network control circuitry 162. The network control circuitry controls the elements of the network 100 (e.g., the server 110, the router 120, the gateway 130 and the hub 140) based at least in part on the network management data that the system 170 retrieves from the elements.

The system 170 is illustrated as including an information querier 171. The information querier 171 develops a query for at least some network management data from a target agent (e.g., the agents 111, 121, 131, 141) in the network 100 and assigns a path for a response from the target agent that is unique to the target agent. In the case of the illustrated embodiment, the information querier 171 assigns a port to the source address of the IP packet bearing the SNMP "get" message that is unique to each agent 111, 121, 131, 141. In making this assignment, the information querier 171 advantageously avoids reserved ports.

For example, the information querier 171 may assign port number 111 to the agent 111, port number 121 to the agent 121, port number 131 to the agent 131 and port number 141 to the agent 141. Those skilled in the art should understand, however, that the port assignment need have no relationship whatsoever to the identity of the target agent and that the ports need not be consecutive or conform to any assignment pattern whatsoever.

Having assigned the ports to their respective target agents (e.g., the agents 111, 121, 131, 141), the information querier then causes packets that bear the SNMP "get" message to be generated and transmitted via the network interface 161 in succession, without having to wait for responses from any of the target agents (e.g., the agents 111, 121, 131, 141).

Each of the target agents (e.g., the agents 111, 121, 131, 141) receives its respective "get" message, queries its respective MIB memories (the MIB memory 112, 122, 132, 142) to retrieve the appropriate MIB information and formulates its respective response in a conventional manner. When the various responses are "packetized" for the return trip to the system 170, the destination address of the packet(s) includes the unique ports that the information querier 171 earlier assigned. This is unlike the prior art, where one return path (e.g., port number 1961) was used for all responses. Thus, the packets bearing the responses return to the system 170 along separate and unique paths and, in the illustrated embodiment, concurrently without being commingled and becoming corrupt.

The system 170 is further illustrated as including a response receiver 172. The response receiver 172 receives, via the paths that the information querier 171 assigned as detailed above, the responses from the various target agents (e.g., the agents 111, 121, 131, 141) containing the at least some the network management data that ostensibly fulfills the queries.

Assuming that responses take one minute apiece, the agents 111, 121, 131, 141 can be queried and return their respective responses in one minute (neglecting network transport times), instead of the four minutes the prior art process required. Extrapolating this to a large network having, say, 3600 managed elements, the various responses can still be returned in one minute instead of the 60 hours that the prior art process would have required. Of course, those skilled in the art will recognize that some responses may be faster or slower than one minute and that certain agents may have to be re-queried. However, a significant time savings can still be realized by applying the principles of the present invention.

Particular to the embodiment illustrated in FIG. 1 is a buffer 173 that receives and contains the responses. The response receiver 172 reads the response from the buffer 173 following a predetermined period of time. Alternatively, the response receiver 172 can count responses and read the responses from the buffer 173 based on the count. Alternatively, the response receiver 172 can handle responses one at a time.

In an alternative embodiment, the system 170 assigns unique source IP addresses to each query. The various responses from the agents use the respective source IP addresses as return paths. Though the responses all arrive at the response receiver 172, they took unique paths getting there. This embodiment is especially useful if the underlying operating system limits the number of ports that can be allocated to a single process or thread.

Figure 2:
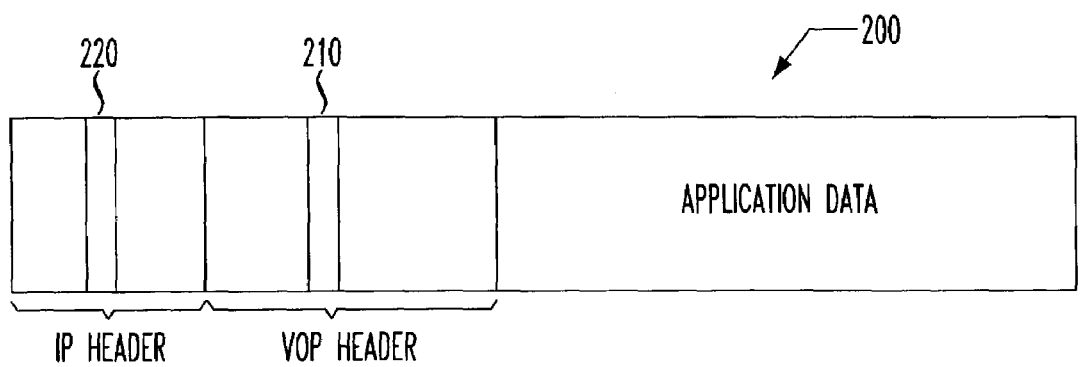
FIG. 2 illustrates a diagram in an Unreliable Delivery Protocol (UDP)/IP packet, including a source address field and a source port that alternative embodiments of the present invention can employ.

Turning now to FIG. 2, illustrated is a diagram of a UDP/IP packet, generally designated 200. The UDP/IP packet 200 includes a source port field 210 in the UDP header portion of the UDP/IP packet 200 that the illustrated embodiment of the present invention employs. FIG. 2 also illustrates a source address field 220 in the IP header portion of the UDP/IP packet 200. As stated above, an alternative embodiment of the present invention can use the source address field to define unique paths for responses.

Those skilled in the pertinent art are familiar with the structure of the UDP/IP packet 200 and how the source port field 210 and source address field 220 are formatted, generated and used to route the packet through an IP network. Those skilled in the art should also realize that a Transmission Control Protocol (TCP)/IP packet may also be employed to bear an SNMP "get" message.

Figure 3:
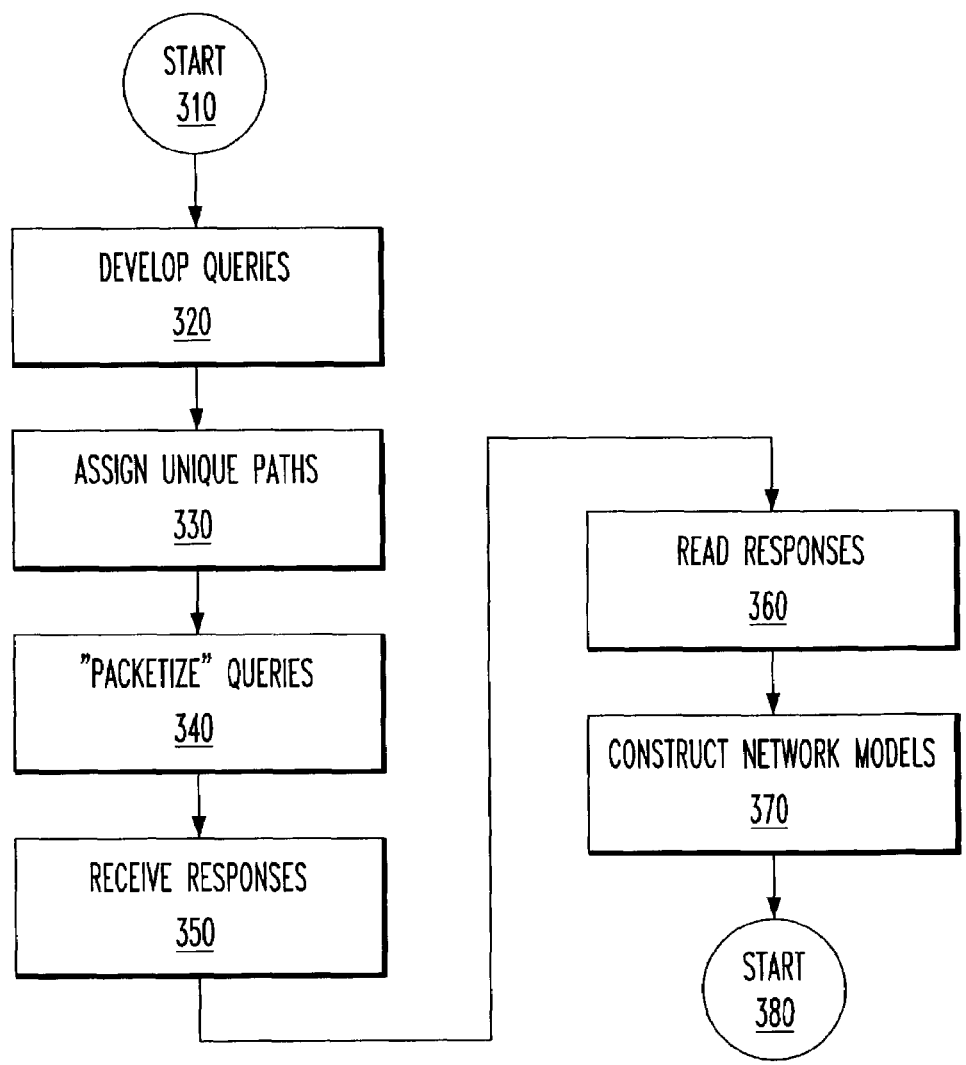
FIG. 3 illustrates a method of retrieving network management data carried out according to the principles of the present invention.

Turning now to FIG. 3, illustrated is a method, generally designated 300, of retrieving network management data carried out according to the principles of the present invention. The method 300 begins in a start step 310, when it is determined that network management data should be retrieved from elements in the network.

The method proceeds to a step 320, in which queries (e.g., SNMP "get" messages) are developed for the elements. Next, in a step 330, a unique path is assigned to each query for its respective response (e.g., a unique port or source address). Then, in a step 340, each query is "packetized" in a packet that indicates the unique path. Then, the queries are transmitted in succession into the network destined for the SNMP target agents associated with their respective elements.

It is assumed that the various target agents then begin to retrieve their respective network management data and generate "packetized" responses along their unique return paths. Though the responses may travel concurrently over the network, they do not commingle by virtue of their unique paths.

Next, in a step 350, the various responses are received into a buffer. In a step 360, the responses are read out from the buffer following some period of time by which it is assumed that most if not all of the responses will have been received. Of course, other procedures for receiving the responses fall within the broad scope of the present invention.

Finally, in a step 370, the network management data thus collected is arranged and employed to construct one or more models of the network employable to optimize the operation of the network or diagnose, localize or resolve problems that may occur in the network from time to time. The method 300 ends in an end step 380.

As a parting note, it should be understood that the NMS may not choose to query all of the elements of the network at once. Instead, it may choose to query a subset of the elements, perhaps a few hundred or few thousand at a time. In such case, once the responses are received via their unique paths, those unique paths become available for reuse vis-a-vis future queries.

Although the above-described and illustrated system, method and NMS operate with an IP Ethernet network and employ SNMS to retrieve network management data and manage the network, those skilled in the pertinent art will readily understand that the principles of the present invention are applicable to protocols other than IP and SNMS and networks other than Ethernet. Also, although one embodiment of the present invention has been described in detail, those skilled in the art should understand that they can make various other changes, substitutions and alterations herein without departing from the spirit and scope of the invention in its broadest form.

What is claimed is:

1. A system for retrieving network management data in a network, comprising:

an information querier, associated with a network management station, that transmits a plurality of queries for at least some network management data from a plurality of distinct target agents in said network, each query being addressed to a corresponding one of said different target agents and being transmitted in succession independent of receiving a response from any of said target agents, each query directing a response from said each of said plurality of said target agents to a different port of said information querier that uniquely corresponds to a particular agent; and a response receiver, associated with said information querier, that receives, via at least one of said different ports, a response from at least one of said target agents.

2. The system as recited in claim 1 wherein said information querier identifies said path in a source address of a packet bearing said query.

3. The system as recited in claim 1 wherein said information querier identifies said path in a port assignment of a packet bearing said query.

4. The system as recited in claim 1 wherein said response receiver comprises a buffer that receives and contains said responses, said response receiver reading said responses from said buffer following a predetermined period of time.

5. The system as recited in claim 1 wherein said query and said response conform to a Simple Network Management Protocol.

6. The system as recited in claim 1 wherein said network is an Internet Protocol network.

7. A method of retrieving network management data in a network, comprising:

transmitting a plurality of queries for at least some network management data from a plurality of different target agents in said network, each query being addressed to a corresponding one of said different target agents and being transmitted in succession independent of receiving a response from any of said target agents, each query directing a response from said each of said plurality of said target agents to a different port of said information querier that uniquely corresponds to a particular agent; and receiving, via at least one of said different ports, a response from at least one of said target agents.

8. The method as recited in claim 7 further comprising identifying said path in a source address of a packet bearing said query.

9. The method as recited in claim 7 further comprising identifying said path in a port assignment of a packet bearing said query.

10. The method as recited in claim 7 wherein said receiving comprises receiving said response from said target agent containing said at least some said network management data into a buffer and said method further comprises reading said response from said buffer following a predetermined period of time.

11. The method as recited in claim 7 wherein said query and said response conform to a Simple Network Management Protocol.

12. The method as recited in claim 7 wherein said network is an Internet Protocol network.

13. A network management station, comprising:
a network interface for linking said network management station to elements in an Ethernet network to be controlled;
a network control circuitry, coupled to said network interface, for controlling said elements based at least in part on network management data retrieved from said elements; and
a system for retrieving said network management data from said elements, including:
an information querier that develops a plurality of Simple Network Management Protocol queries for at least some network management data from a plurality of different target agents associated with said elements, each query being addressed to a corresponding one of said different target agents and being transmitted in succession independent of receiving a response from any of said target agents, each query directing a response from said each of said plurality of said target agents to a different port of said information querier that uniquely corresponds to a particular agent, and
a response receiver, associated with said information querier, that receives, via at least one of said different ports, a response from at least one of said target agents.

14. The network management station as recited in claim 13 wherein said information querier identifies said path in a source address of an Internet Protocol packet bearing said query.

15. The network management station as recited in claim 13 wherein said information querier identifies said path in a port assignment in an Internet Protocol packet bearing said query.

16. The network management station as recited in claim 13 wherein said response receiver comprises a buffer that receives and contains said response, said response receiver reading said response from said buffer following a predetermined period of time.

17. The system as recited in claim 13 wherein said query and said response conform to a Simple Network Management Protocol.

* * * * *